(No Model.)
D. ROBINSON.
TOBACCO PLANT SLITTER AND CUTTER.
No. 311,375. Patented Jan. 27, 1885.
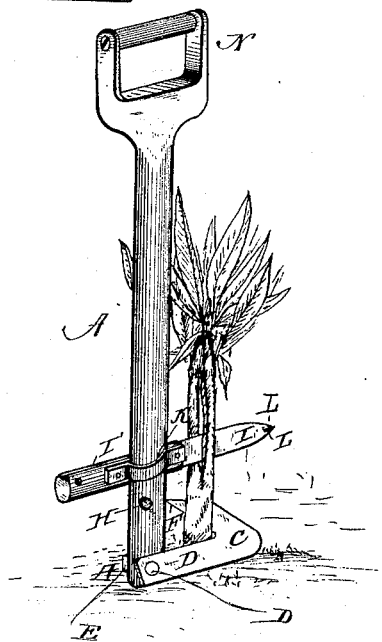
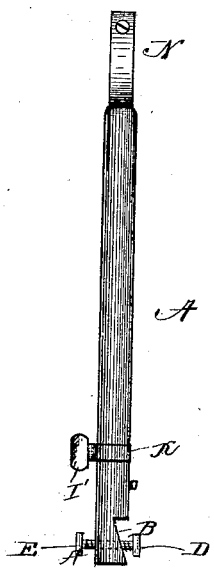
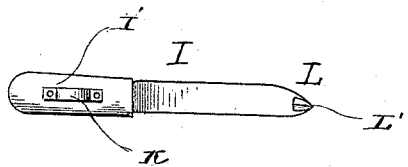

UNITED STATES PATENT OFFICE.

DAVID ROBINSON, OF REYNOLDS, ILLINOIS.

TOBACCO-PLANT SLITTER AND CUTTER.

SPECIFICATION forming part of Letters Patent No. 311,375, dated January 27, 1885.

Application filed May 10, 1884. (No model.)

*To all whom it may concern:*

Be it known that I, DAVID ROBINSON, a citizen of the United States, residing at Reynolds, in the county of Rock Island and State of Illinois, have invented a new and useful Combined Tobacco-Plant Slitter and Cutter, of which the following is a specification, reference being had to the accompanying drawings.

This invention has relation to a combined tobacco-plant slitter and cutter designed to split the standing stalk and cut it off at the ground; and it consists in the construction and novel arrangement of parts, as will be hereinafter fully described, and particularly pointed out in the claims.

Figure 1 is a view in perspective of a tobacco-plant slitter and cutter embodying my improvements. Fig. 2 is a view of the handle with the lower knife removed, and Fig. 3 is a view of the sliding knife detached.

Referring by letter to the accompanying drawings, A designates the handle of the tobacco-plant slitter and cutter, which is provided in one of its faces with a beveled recess, B, in which the heel of the stationary knife C is seated, and is secured in place by a screw-bolt, D, and nut E. The knife C has an upper beveled cutting-edge, and is provided with a curved or bent point, F, extending from it at a right angle, and is designed to engage the tobacco-stalk on the side farthest from the handle A when the knife is applied to the stalk. The handle A is provided a short distance above the knife C with a cross-pin, H, which prevents the sliding knife I from coming in contact with the stationary knife C. The sliding and slitting knife I is connected to the handle A by a clasp, K, secured to the handle I' of the knife I. The knife I is sharpened on both edges, and is provided with a point, L, which is sharpened on both edges, and is provided immediately at its point on one face with a small inclined stop, L', which prevents the cut stalk from accidentally slipping from the knife I until the stalk has been carried to the place, where it is removed and strung upon the laths by which the tobacco is to be suspended while undergoing the curing process. The handle A is provided with a hand-piece, N, which is grasped with the left hand when operating the tobacco-plant slitter and cutter.

In operation the knife C is placed on the ground near the base of the stalk, and the splitting-knife I is forced through the middle of the stalk, and with the right hand the splitting-knife is pulled up through the middle of the stalk. Then both hands are used, and the knife C is drawn up to cut the stalk off at the bottom. By this construction and mode of operation the work can be rapidly and neatly performed. The cutter is simple and easily operated.

Having thus fully described my invention, what I claim as new, and desire to secure by Letters Patent, is—

1. In a tobacco-plant slitter and cutter, the combination, with the handle A, provided with the cross-pin H, of the stationary knife C, having the bent point F, and the sliding splitting-knife I, held to the handle A by a clasp, substantially as specified.

2. In a tobacco-plant slitter and cutter, the combination, with the handle A and cross-pin H, of the sliding splitting-knife I, held to the handle A, and provided with the inclined stop L', substantially as specified.

In testimony that I claim the foregoing as my own I have hereto affixed my signature in presence of two witnesses.

DAVID ROBINSON.

Witnesses:
GEORGE ROBINSON,
ARTHUR ROBINSON.